(12) United States Patent
Pang et al.

(10) Patent No.: US 9,935,989 B2
(45) Date of Patent: Apr. 3, 2018

(54) SYSTEM AND APPARATUS FOR USER COMMUNICATIONS

(71) Applicant: TENCENT TECHNOLOGY (SHENZHEN) COMPANY LIMITED, Shenzhen (CN)

(72) Inventors: Mengyu Pang, Shenzhen (CN); Jianhua Huang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 222 days.

(21) Appl. No.: 14/751,125

(22) Filed: Jun. 25, 2015

(65) Prior Publication Data

US 2015/0295963 A1   Oct. 15, 2015

Related U.S. Application Data

(63) Continuation of application No. PCT/CN2013/084417, filed on Sep. 27, 2013.

(30) Foreign Application Priority Data

Dec. 26, 2012 (CN) .......................... 2012 1 0575644

(51) Int. Cl.
*H04L 29/06* (2006.01)
*H04L 29/08* (2006.01)
(Continued)

(52) U.S. Cl.
CPC ........ *H04L 65/403* (2013.01); *H04L 12/1818* (2013.01); *H04L 51/04* (2013.01); *H04W 4/206* (2013.01)

(58) Field of Classification Search
CPC ... H04L 12/1818; H04L 51/04; H04L 65/403; H04L 67/10; H04L 67/42; H04W 4/206
(Continued)

(56) References Cited

U.S. PATENT DOCUMENTS 9,479,900 B2* 10/2016 Xu .......................... H04L 51/20
2003/0083045 A1   5/2003 Blight et al.
(Continued)

FOREIGN PATENT DOCUMENTS

CN       1885861 A    12/2006
CN       1968110 A     5/2007
(Continued)

OTHER PUBLICATIONS

"Bonjour with MonoTouch," mikebluestein.com, Nov. 23, 2010.*
(Continued)

*Primary Examiner* — Alina N Boutah
(74) *Attorney, Agent, or Firm* — Anova Law Group, PLLC

(57) ABSTRACT

Embodiments of the present disclosure provide a method for communication program association. The method includes acquiring a communication program account number in the local area network; sending a communication association request to the communication program account number in the local area network; and receiving communication association confirmation information returned by the communication program account number in the local area network, and establishing communication association with the communication program account number in the local area network. Because the established associated communication program account number does not occupy significant network bandwidth in the communication process, the network transmission speed is improved. Because communication is performed on the local network, security of communication information is ensured.

14 Claims, 5 Drawing Sheets

(51) Int. Cl.
*H04L 12/58* (2006.01)
*H04L 12/18* (2006.01)
*H04W 4/20* (2018.01)

(58) Field of Classification Search
USPC .................................................. 709/203–207
See application file for complete search history.

(56) References Cited

U.S. PATENT DOCUMENTS

| | | | | |
|---|---|---|---|---|
| 2009/0279682 | A1* | 11/2009 | Strandell | H04L 63/18 379/201.02 |
| 2010/0235758 | A1* | 9/2010 | Shen | H04L 12/581 715/752 |
| 2012/0295601 | A1* | 11/2012 | Lang | G06Q 10/10 455/415 |
| 2013/0041742 | A1* | 2/2013 | Zhang | G06Q 30/0207 705/14.36 |
| 2013/0144951 | A1* | 6/2013 | Viswanath | H04L 29/08 709/204 |
| 2013/0339493 | A1* | 12/2013 | Zheng | G06F 17/3089 709/219 |
| 2014/0040390 | A1* | 2/2014 | Li | H04L 67/26 709/206 |
| 2014/0101272 | A1* | 4/2014 | Li | H04L 51/04 709/206 |
| 2014/0115081 | A1* | 4/2014 | Ku | H04L 67/24 709/206 |
| 2014/0207888 | A1* | 7/2014 | Zheng | H04L 51/04 709/206 |

FOREIGN PATENT DOCUMENTS

| | | |
|---|---|---|
| CN | 1968117 A | 5/2007 |
| CN | 1968290 A | 5/2007 |
| CN | 102447652 A | 5/2012 |
| CN | 102547556 A | 7/2012 |

OTHER PUBLICATIONS

State Intellectual Property Office of the P.R.C (SIPO) Office Action 1 for 201210575644.4 dated Mar. 20, 2017 6 Pages.
The World Intellectual Property Organization (WIPO) International Search Report for PCT/CN2013/084417 dated Jan. 2, 2014.

* cited by examiner

SYSTEM AND APPARATUS FOR USER COMMUNICATIONS

RELATED APPLICATION

This application claims priority to PCT Application No. PCT/CN2013/084417, filed on Sep. 27, 2013, which claims priority to Chinese Patent Application No. 201210575644.4, filed on Dec. 26, 2012 to the State Intellectual Property Office of the People's Republic of China, and entitled "SYSTEM AND APPARATUS FOR USER COMMUNICATIONS." The two priority applications are incorporated herein by reference.

FIELD OF THE TECHNOLOGY

The present disclosure relates to the field of instant messaging (IM) technologies, and in particular, to a method for communication program association and apparatus based on a local area network, and a storage medium.

BACKGROUND OF THE DISCLOSURE

Communication programs are, for example, an instant messaging (IM) program that can send and receive information instantly, or a social networking services (SNS) program that can help people establish an Internet communication relationship of a social network, such as microblog. QQ is an example of the IM program. Among existing QQ tools, QQ account numbers that are near the same geographic coordinates may be found. That is, a QQ user may find users who are using QQ nearby. The premise is that the nearby users who are using QQ also enable a matching function of geographical positions.

In an existing QQ application, when a user communicates with QQ users that are near the same geographic positions, a network bandwidth may be occupied. As a result, network resource is being consumed and the network speed is reduced. Moreover, when multiple QQ users communicate simultaneously, information may leak because of uncertainties in network security.

SUMMARY

Embodiments of the present invention provide a method for communication program association based on a local area network. The method includes: acquiring a communication program account number in the local area network; sending a communication association request to the communication program account number in the local area network; and receiving communication association confirmation information returned by the communication program account number in the local area network, and establishing communication association with the communication program account number in the local area network.

The embodiments of the present invention further provide an apparatus for communication program association based on a local area network. The apparatus includes an account number acquiring module, configured to acquire a communication program account number in the local area network; a request sending module, configured to send a communication association request to the communication program account number in the local area network; and an association establishing module, configured to receive communication association confirmation information returned by the communication program account number in the local area network, and establish communication association with the communication program account number in the local area network.

The embodiments of the present invention further provide a storage medium that stores a processor executable instruction. The processor executable instruction being used for causing a processor to complete the following operations: acquiring a communication program account number in the local area network; sending a communication association request to the communication program account number in the local area network; and receiving communication association confirmation information returned by the communication program account number in the local area network, and establishing communication association with the communication program account number in the local area network.

In the embodiments of the present invention, a client may create a communication service based on a local area network, search for a communication program account number that also create the communication service in the local area network according to the created communication service. The client may then send a communication association request to the found communication program account number to establish communication. The communication may be established after confirmation information returned by another communication program account number is received. In the embodiments of the present invention, local network transmission advantages of the local area network can be fully used, enabling communication program clients to identify each other and establish communication in the local area network, and extending applications of the communication program clients in the local area network. Outside the local network, network bandwidth is hardly occupied in the communication process, which improves the network transmission speed. Moreover, because communication is performed by using a local (or internal) network, security of communication information is improved, and information leak may be avoided.

To make the foregoing content of the present disclosure more obvious and comprehensible, a detailed description is provided below by using listed preferred embodiments with reference to the accompanying drawings.

DESCRIPTION OF EMBODIMENTS

Figure 1:
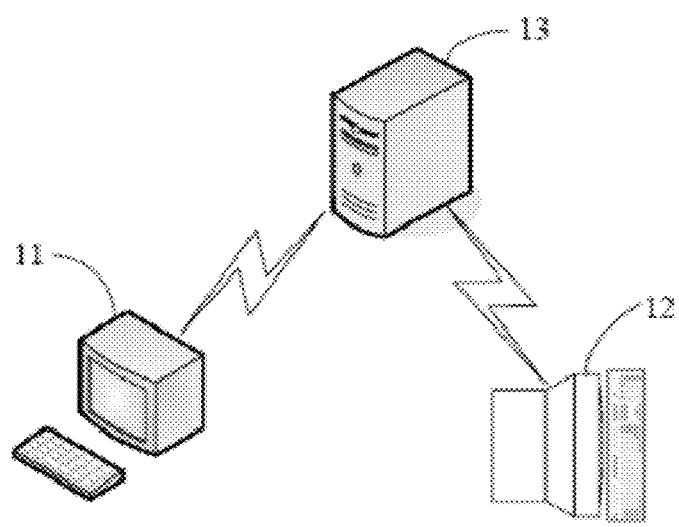
FIG. 1 is a schematic diagram of an operating environment of a method for communication program association based on a local area network according to an embodiment of the present invention.

Referring to the drawings, the same component symbols represent the same components. The principle of the present disclosure is implemented in a suitable computing environment for illustrative purposes. The following description is based on the specific embodiments of the present invention shown by examples, which should not be construed as limiting other specific embodiments of the present invention that are not described in detail herein.

In the following description, the specific embodiments of the present invention will be described with reference to the steps or elements that are performed by one or more computers, unless otherwise described. Therefore, it will be mentioned for several times that the steps and operations are executed by the computer. The computer execution described in the article includes operations performed by a computer processing unit that represents electronic signals of data in a structured type. The operations convert the data or maintain the data in a position in a memory system of the computer, which may reconfigure or change the way in which the computer is operated by means of a manner known to a skilled person. A data structure of the maintained data is at a physical position in the memory, and the data structure has specific properties defined by the data format. However, based on the description in the above text, the principle of the present disclosure does not represent as a limitation, and a person skilled in the art may be able to learn that multiple following steps and operations may also be implemented in hardware.

The principle of the present disclosure is operated by using many other computation of versatility or specific objectives, communication environments, or configuration. The well-known example of computation systems, the environments, or the configuration suitable for the present disclosure may include (but is not limited to) a handy phone, a personal computer, a server, a multiprocessor system, a minicomputer-dominated system, a mainframe computer, and a distributed computing environment including any system or apparatus described above.

The term "module" described in the article may be regarded as a software object executed in the computing system. The different components, modules, engines, and services described in the article may be regarded as implementation objects in the computing system. The apparatus and method described in the article are preferably implemented in a manner of software, and certainly may be implemented by means of hardware, which both fall within the protection scope of the present disclosure.

Referring to FIG. 1, FIG. 1 is a schematic diagram of an operating environment of a method for communication program association based on a local area network according to an embodiment of the present invention, including a function initiating client 11, a function receiving client 12, and a server 13. The function initiating client 11 and the function receiving client 12 are located in a local area network provided by the server 13, i.e., a local area network (LAN), and can access each other by means of the local area network.

The function initiating client 11 or the function receiving client 12 may be a desktop computer. The function initiating client 11 or the function receiving client 12 may also be computing terminals that include a storage unit, are installed with a microprocessor, such as a notebook computer, a work station, a palmtop computer, an ultra mobile personal computer (UMPC), a tablet PC, a personal digital assistant (PDA), a web pad, a portable phone, or the like.

Figure 2:
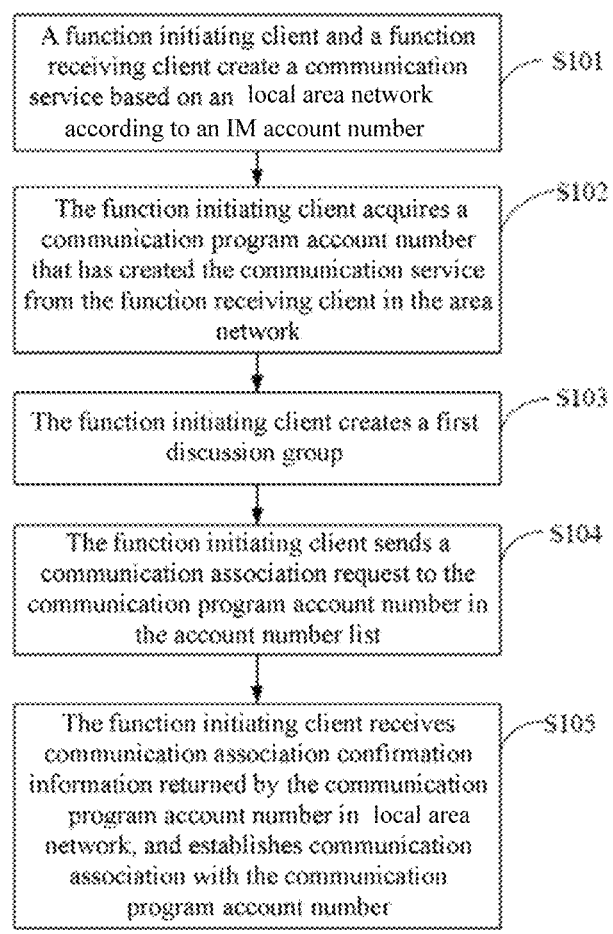
FIG. 2 is a schematic flowchart of an embodiment of a method for communication program association based on a local area network according to a first preferred embodiment of the present invention.

Referring to FIG. 2, FIG. 2 is a schematic flowchart of a first preferred embodiment of a method for communication program association based on a local area network according to the present disclosure.

Step S101: The function initiating client 11 and the function receiving client 12 create a communication service on a local area network according to an IM account number.

In this embodiment of the present invention, a communication program (NSNetService) may be created by using Bonjour. The communication service has a communication service identifier, and the communication service identifier includes a machine code, a program name, a protocol name, or a domain name. In the specific implementation process, a communication program browsing service (NSNetServiceBrowser) may be simultaneously configured, and another communication service in the local area network is acquired by using the communication program browsing service.

The communication program in this embodiment of the present invention may be an IM program that is used for sending and receiving information instantly, such as a QQ application program, may be an SNS program such as microblog. The communication program may also be another application program that can communicate, such as WeChat. All communication programs with functionalities similar to an IM program, etc., fall within the protection scope of this embodiment of the present invention, which is not enumerated herein.

Step S102: The function initiating client 11 acquires a communication program account number that has created the communication service from the function receiving client 12 in the local area network.

In the specific implementation process, the function initiating client 11 searches the local area network for a communication program account number that has created the communication service in the function receiving client 12 by using the created communication service. For example, another communication program account number that has created the communication service is searched for by using the communication program browsing service. Then an account number list is generated, and the found communication program account number is stored into the account number list.

Step S103: The function initiating client 11 pre-creates a first discussion group.

In this embodiment of the present invention, the first discussion group is used to provide communication between at least two communication program account numbers, such as a QQ group.

Step S104: The function initiating client 11 sends a communication association request to the communication program account number in the account number list, to add the communication program account number in the account number list into the first discussion group.

Step S105: The function initiating client 11 receives communication association confirmation information returned by the communication program account number in the local area network, and establishes communication association with the communication program account number in function receiving client 12 in the local area network.

Using that a communication program is an IM program and the IM program is QQ as an example, the function initiating client 11 may first create a QQ communication service and a QQ browsing service in the local area network by using Bonjour. The function initiating client 11 may then search the local area network for a QQ account number that has created the QQ communication service in the function receiving client 12 by using the QQ browsing service (for example, performing screening to obtain an IM service that has a QQ identifier and extracting a corresponding QQ account number). Then the found QQ account number is stored into the account number list. Finally, the function initiating client 11 communicates with each QQ account number that publishes the QQ communication service, and exchanges identity information with each other. If a discussion group already exists in the local area network, another QQ account number is notified that the discussion group already exists, and the server 13 adds the another QQ account number into the discussion group.

Association relationship establishment in this embodiment of the present invention refers to that one communication program account number establishes a relationship with another communication program account number, such as, establishing a "friend" relationship in QQ or establishing a "following each other" relationship in microblog. Communication program account numbers between which association is established can communicate by means of the local area network.

Figure 3:
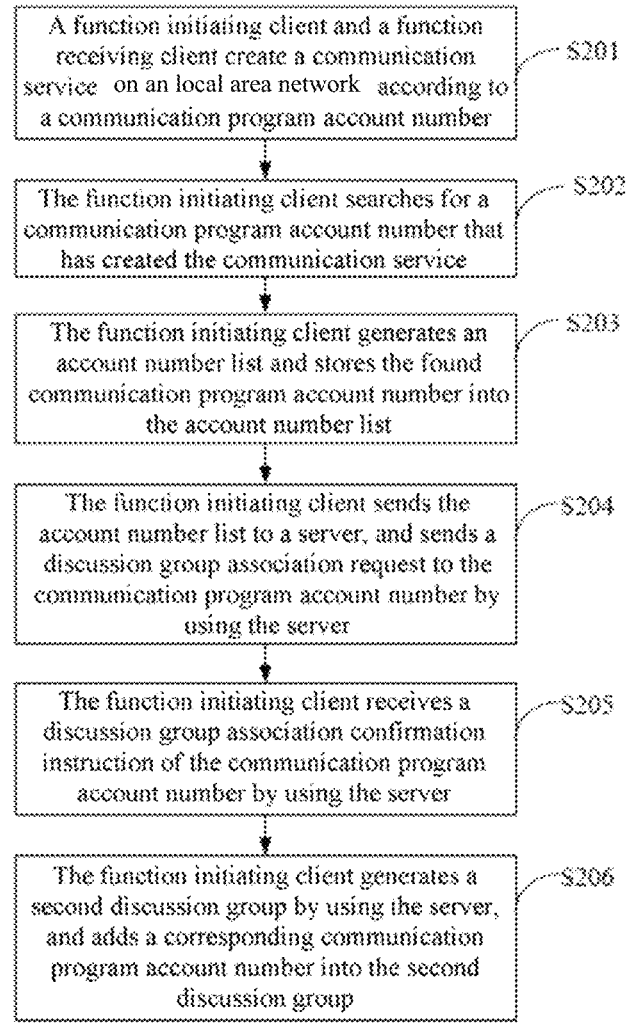
FIG. 3 is a schematic flowchart of a method for communication program association based on a local area network according to a second preferred embodiment of the present invention.

Referring to FIG. 3, FIG. 3 is a schematic flowchart of a second preferred embodiment of a method for communication program association based on a local area network according to the present disclosure.

Step S201: The function initiating client 11 and the function receiving client 12 create a communication service based on a local area network according to a communication program account number.

Step S202: The function initiating client 11 searches the local area network for a communication program account number that has created the communication service in the function receiving client 12 by using the created communication service.

Step S203: The function initiating client 11 generates an account number list and stores the found communication program account number that has created the IM program in the function receiving client 12 into the account number list.

Detailed description of step S201 to step S203 are disclosed above, which is not repeated in detail herein.

Step S204: The function initiating client 11 sends the account number list to the server 13, and sends a discussion group association request to the communication program account number in the account number list by using the server 13.

Step S205: The function initiating client 11 receives a discussion group association confirmation instruction of the communication program account number in the account number list by using the server 13.

Step S206: The function initiating client 11 generates a second discussion group by using the server 13, and adds a corresponding communication program account number in the function receiving client 12 into the second discussion group. The second discussion group is used to provide communication between at least two communication program account numbers.

Figure 4:
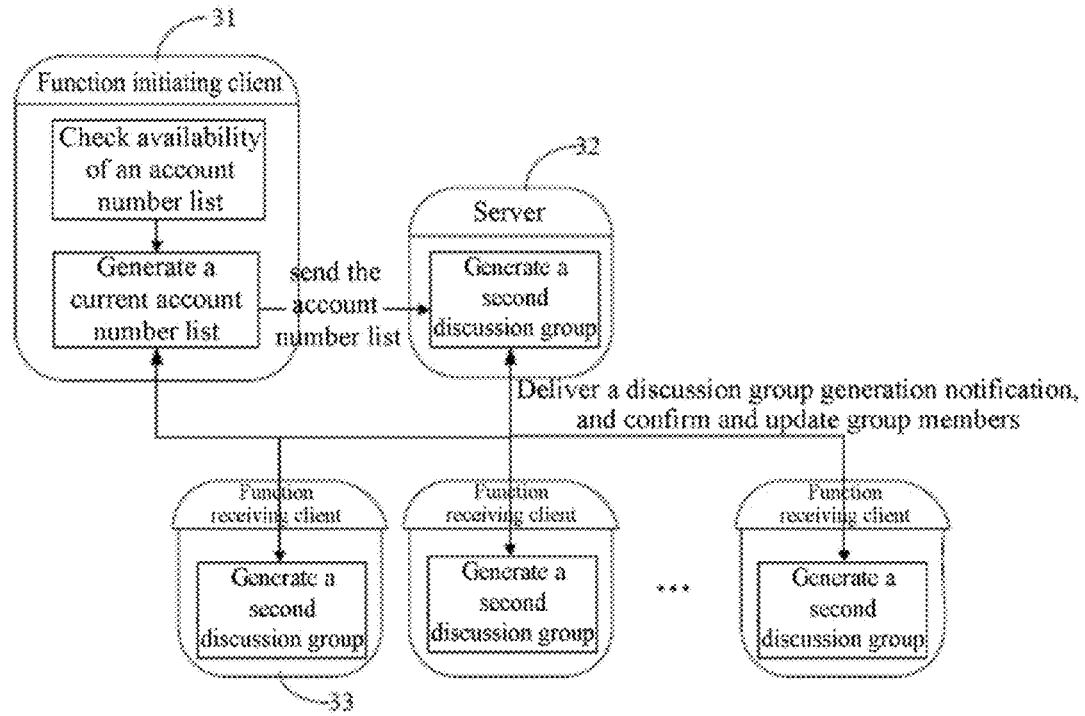
FIG. 4 is a schematic structural diagram of a communication system based on a local area network according to an embodiment of the present invention.

Referring to FIG. 4, FIG. 4 is a schematic structural diagram of a preferred embodiment of a communication system based on a local area network according to the present disclosure. The system includes a function initiating client 31, a server 12, and a function receiving client 33.

The function initiating client 31 checks correctness of an account number list based the local area network in the client. That is, the function initiating client 31 first compares a currently found communication program account number with a pre-stored communication program account number in the account number list, and if difference exists, the account number list is updated. A communication program account number that accidentally drops or switches a local area network may be screened out in the foregoing manner. Then the function initiating client 31 sends the account number list to the server 32, and the server 32 sends a discussion group association request to the function receiving client 33 corresponding to the communication program account number in the account number list after receiving the account number list. After the function receiving client 33 receives the discussion group association request, a user may click to confirm whether communication association is established, and if the user clicks to confirm that the communication association is established, the function receiving client 33 sends a discussion group association confirmation instruction to the server 32. After collecting the discussion group association confirmation instruction, the server 32 generates a second discussion group and sends the discussion group association confirmation instruction to each function receiving client 33 that agrees to join in the second discussion group to add the communication program account number in the function receiving client 33 into the second discussion group.

This embodiment of the present invention may automatically discover and generate a discussion group at the push of a key in the local area network, and enable a communication program (such as a QQ client) to have an attribute of local area network broadcast communication; may automatically discover and present communication programs (such as the QQ client) in platforms and terminals in the local area network; and may directly establish a discussion group of a special association relationship community based on a same area network. Little network bandwidth is occupied during communication in the discussion group, which improves the network transmission speed, ensures security of communication information, and avoids information leak.

Figure 5:
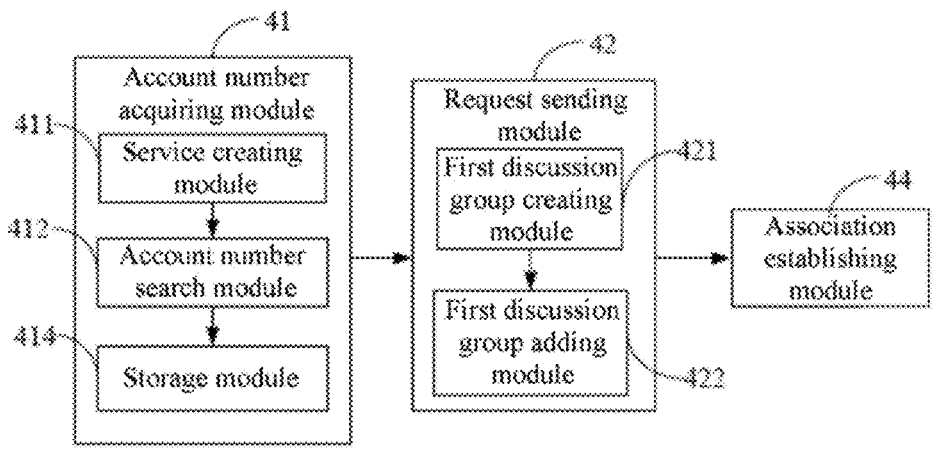
FIG. 5 is a schematic structural diagram of an apparatus for communication program association based on a local area network according to a first preferred embodiment of the present invention.

Referring to FIG. 5, FIG. 5 is a schematic structural diagram of a first preferred embodiment of an apparatus for communication program association based on a local area network according to the present disclosure. The apparatus includes an account number acquiring module 41, a request sending module 42, and an association establishing module 43.

The account number acquiring module 41 is configured to acquire a communication program account number in the local area network. More specifically, the account number acquiring module 41 includes a service creating module 411, an account number search module 412, and a storage module 413.

The service creating module 411 is configured to create a communication service in the local area network according to the communication program account number; the account number search module 412 is configured to search for another communication program account number that has created the communication service in the local area network by using the communication service created by the service creating module; and the storage module 413 is configured to generate an account number list and store the communication program account number found by the account number search module into the account number list.

The communication service has a communication service identifier, and the communication service identifier includes a machine code, a program name, a protocol name, or a domain name. Certainly, another communication service identifier may also be included, which is not enumerated herein.

The request sending module 42 is configured to send a communication association request to the communication program account number in the local area network. More specifically, the request sending module 42 includes a first discussion group creating module 421 and a first discussion group adding module 422.

The first discussion group creating module 421 is configured to create a first discussion group. The first discussion group is used to provide communication between at least two communication program account numbers. The first discussion group adding module 422 is configured to send the communication association request to the communication program account number in the account number list to add the communication program account number in the account number list into the first discussion group.

The association establishing module 43 is configured to receive communication association confirmation information returned by the communication program account number in the local area network, and establish communication association with the communication program account number in the local area network.

Figure 6:
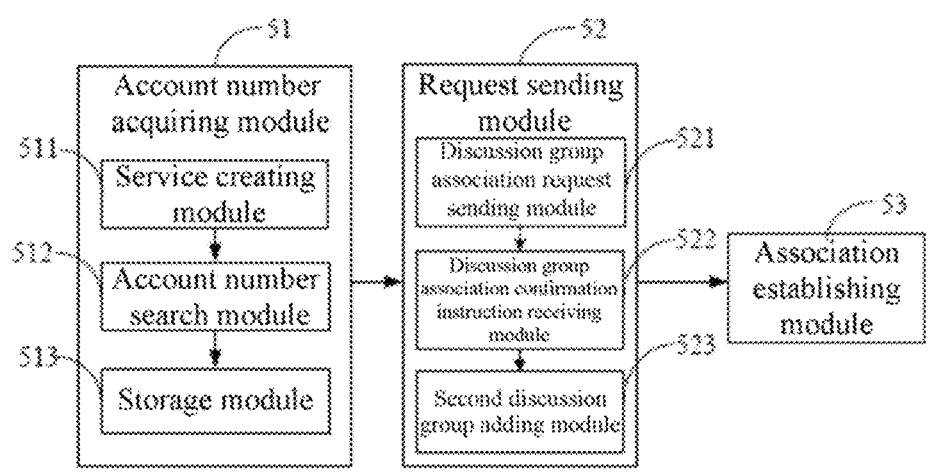
FIG. 6 is a schematic structural diagram of an apparatus for communication program association based on a local area network according to a second preferred embodiment of the present invention.

Referring to FIG. 6, FIG. 6 is a schematic structural diagram of a second preferred embodiment of an apparatus for communication program association based on a local area network according to the present disclosure. The apparatus includes an account number acquiring module 51, a request sending module 52, and an association establishing module 53.

The account number acquiring module 51 is configured to acquire a communication program account number in the local area network. More specifically, the account number acquiring module 51 includes a service creating module 511, an account number search module 512, and a storage module 513.

The service creating module 511 is configured to create a communication service in the local area network according to the communication program account number. The account number search module 512 is configured to search for another communication program account number that has created the communication service in the local area network by using the communication service created by the service creating module 511. The storage module 513 is configured to generate an account number list and store the communication program account number found by the account number search module 512 into the account number list.

The communication service has a communication service identifier, and the communication service identifier includes a machine code, a program name, a protocol name, or a domain name. Certainly, another communication service identifier may also be included, which is not enumerated herein.

The request sending module 52 is configured to send a communication association request to the communication program account number in the local area network. More specifically, the request sending module 52 includes a discussion group association request sending module 521, a discussion group association confirmation instruction receiving module 522, and a second discussion group adding module 523.

The discussion group association request sending module 521 is configured to send the account number list to a server, and send a discussion group association request to the communication program account number in the account number list by using the server. The discussion group association confirmation instruction receiving module 522 is configured to receive a discussion group association confirmation instruction of the communication program account number in the account number list by using the server. The second discussion group adding module 523 is configured to generate a second discussion group by using the server, and add a corresponding communication program account number into the second discussion group. The second discussion group is used to provide communication between at least two communication program account numbers.

The association establishing module 53 is configured to control the communication program account number to establish communication association with another communication program account number in the local area network.

The detailed operating principles of modules in the first and the second preferred embodiments of the apparatus for communication program association based on a local area network according to the present disclosure, are discussed in the detailed descriptions about the first and the second preferred embodiments, which are not described herein again.

An apparatus for communication program association based on a local area network according to an embodiment of the present invention may be in a terminal. The terminal is, for example, a computer, a tablet computer, a mobile phone having a touch function, or the like. The apparatus for communication program association based on a local area network is based on the same concept as the communication program association method based on a local area network in the foregoing embodiments. Any method provided in the embodiments of the communication program association method based on a local area network may be operated on the apparatus for communication program association based on a local area network. Details of the specific implementation process are discussed with the foregoing embodiments about the communication program association method based on a local area network, which are not described herein again.

In the embodiments of the present invention, a client may create a communication service based on a local area network, search for a communication program account number that also creates the communication service in the local area network according to the created communication service, and then send a communication association request to the found communication program account number to establish communication. The communication may be established after confirmation information returned by another communication program account number is received. In the embodiments of the present invention, local network transmission advantages of the local area network can be fully realized, enabling communication program clients to identify each other and establish communication in the local area network, and extending applications of the communication program clients in the local area network. Little network bandwidth is occupied in a communication process, which is therefore beneficial to improving the network transmission speed. Moreover, because communication is performed by using a local network, security of communication information is improved, and information leak is avoided.

It should be noted that for a method for communication program association based on a local area network according to an embodiment of the present invention, a person of ordinary skill in the art may understand that all or some of the processes of the method for communication program association may be implemented by a computer program controlling relevant hardware. The computer program may be stored in a computer readable storage medium, such as being stored in a memory of a terminal and executed by at least one processor in the terminal. In the execution process, the processes of the foregoing embodiment of a method for communication program association based on a local area network may be included. The storage medium may be a magnetic disk, an optical disc, a read-only memory (ROM), a random access memory (RAM) or the like.

For an apparatus for communication program association based on a local area network according to an embodiment of the present invention, the functional modules thereof may be integrated into one processing chip, or each of the modules may exist alone physically, or two or more modules may be integrated into one module. The integrated module may be implemented in the form of hardware, or may be implemented in the form of a software functional module. When the integrated module is implemented in a form of a software functional module and sold or used as an independent product, the integrated module may also be stored in a computer-readable storage medium. The storage medium is, for example, a ROM, a magnetic disk, an optical disc, or the like.

Preferred embodiments are not intended to limit the present disclosure. A person of ordinary skill in the art can make various variations and improvements without departing from the spirit and scope of the present disclosure. Therefore, the protection scope of the present disclosure is subject to the scope defined by claims.

What is claimed is:

1. A method for communication program association in a local area network, comprising:
    creating, by a first client associated with a first communication program account number, a first communication service and a communication program browsing service within the local area network;
    using the created communication program browsing service to search within the local area network for a second communication program account number having a second communication service same as the created first communication service;
    acquiring the second communication program account number having the second communication service same as the created first communication service in the local area network;
    sending a communication association request to the acquired communication program account number in the local area network; and
    receiving communication association confirmation information returned by a second client associated with the second communication program account number in the local area network, and establishing a communication association between the first communication program account number and the acquired communication program account number in the local area network,
    wherein sending the communication association request to the acquired communication program account number comprises:
    sending an account number list to a server, wherein each communication program account number in the account number list is in the local area network and has a communication service same as the created first communication service;
    sending, by the server, a discussion group association request to the acquired communication program account number in the account number list;
    receiving, by the server, a discussion group association confirmation instruction of the acquired communication program account number in the account number list; and
    generating, by the server, a second discussion group for the acquired communication program account number that returns the discussion group association confirmation instruction.

2. The method for communication program association according to claim 1, wherein the step of sending a communication association request to the acquired communication program account number comprises:
    sending the communication association request to the acquired communication program account number in the account number list to add the acquired communication program account number in the account number list into a pre-created first discussion group.

3. The method for communication program association according to claim 1, wherein the first communication service has a communication service identifier, and the communication service identifier comprises at least one of machine code, a program name, a protocol name, and a domain name.

4. The method for communication program association according to claim 1, wherein the communication program account number is an instant messaging (IM) program account number.

5. An apparatus for communication program association in a local area network, comprising:
    a memory; and
    a processor coupled to the memory, the processor being configured to:
    create, by a first client associated with a first communication program account number, a first communication service and a communication program browsing service within the local area network;
    use the created communication program browsing service to search within the local area network for a second communication program account number having a second communication service same as the created first communication service;
    acquire the communication program account number having the second communication service same as the created first communication service in the local area network;
    send a communication association request to the acquired communication program account number in the local area network; and
    receive communication association confirmation information returned by a second client associated with the second communication program account number in the local area network, and establish a communication association between the first communication program account number and the acquired communication program account number in the local area network,
    wherein the processor is further configured to: send an account number list to a server, wherein each communication program account number in the account number list is in the local area network and has a communication service same as the created first communication service,
    wherein the server is configured to send a discussion group association request to the acquired communication program account number in the account number list, receive a discussion group association confirmation instruction of the acquired communication program account number in the account number list, generate a second discussion group for the acquired communication program account number that returns the discussion group association confirmation instruction.

6. The apparatus for communication program association according to claim 5, wherein the processor is further configured:
to send the communication association request to the acquired communication program account number in the account number list, to add the acquired communication program account number in the account number list into a pre-created first discussion group.

7. The apparatus for communication program association according to claim 5, wherein the first communication service has a communication service identifier, and the communication service identifier comprises at least one of machine code, a program name, a protocol name, and a domain name.

8. The apparatus for communication program association based on a local area network according to claim 5, wherein the communication program account number is an IM program account number.

9. A non-transitory storage medium that stores a processor executable instruction, the processor executable instruction being executed for causing a hardware processor to complete the following operations:
creating, by a first client associated with a first communication program account number, a first communication service and a communication program browsing service within the local area network;
using the created communication program browsing service to search within the local area network for a second communication program account number having a second communication service same as the created first communication service;
acquiring the second communication program account number having the second communication service same as the created first communication service in the local area network;
sending a communication association request to the acquired communication program account number in the local area network; and
receiving communication association confirmation information returned by a second client associated with the second communication program account number in the local area network, and establishing a communication association between the first communication program account number and the acquired communication program account number in the local area network,
wherein sending the communication association request to the acquired communication program account number comprises:

sending an account number list to a server, wherein each communication program account number in the account number list is in the local area network and has a communication service same as the created first communication service;
sending, by the server, a discussion group association request to the acquired communication program account number in the account number list;
receiving, by the server, a discussion group association confirmation instruction of the acquired communication program account number in the account number list; and
generating, by the server, a second discussion group for the acquired communication program account number that returns the discussion group association confirmation instruction.

10. The non-transitory storage medium according to claim 9, the processor executable instruction stored in the storage medium being further executed for causing the hardware processor to complete the following operation:
sending the communication association request to the acquired communication program account number in the account number list to add the acquired communication program account number in the account number list into a pre-created first discussion group when the communication association request is sent to the communication program account number in the local area network.

11. The non-transitory storage medium according to claim 9, wherein the first communication service has a communication service identifier, and the communication service identifier comprises at least one of machine code, a program name, a protocol name, and a domain name.

12. The non-transitory storage medium according to claim 9, wherein the communication program account number is an IM program account number.

13. The method for communication program association according to claim 1, wherein establishing the communication association with the acquired communication program account number in the local area network includes one of:
establishing a "friend" relationship, and
establishing a "following each other" relationship.

14. The method for communication program association according to claim 1, wherein:
a communication program account number the created first communication service and the created communication program browsing service correspond to a communication program account number, which establishes the communication association with the acquired communication program account number in the local area network.

* * * * *